C. OESTREICH.
SAW FILING AND SETTING FRAME.
APPLICATION FILED MAY 24, 1912.
1,074,134.
Patented Sept. 30, 1913.
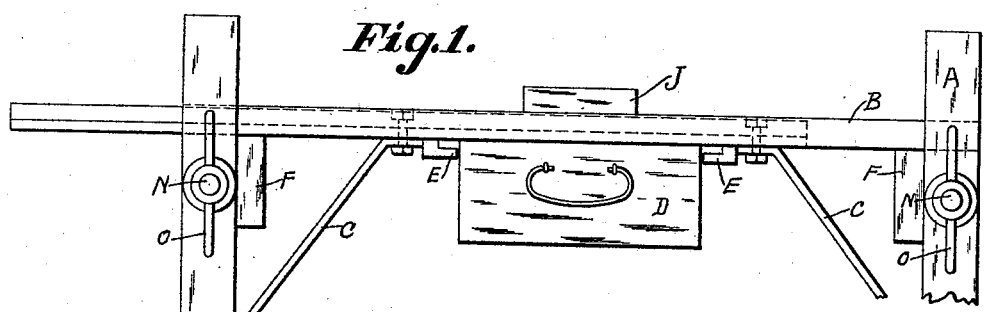
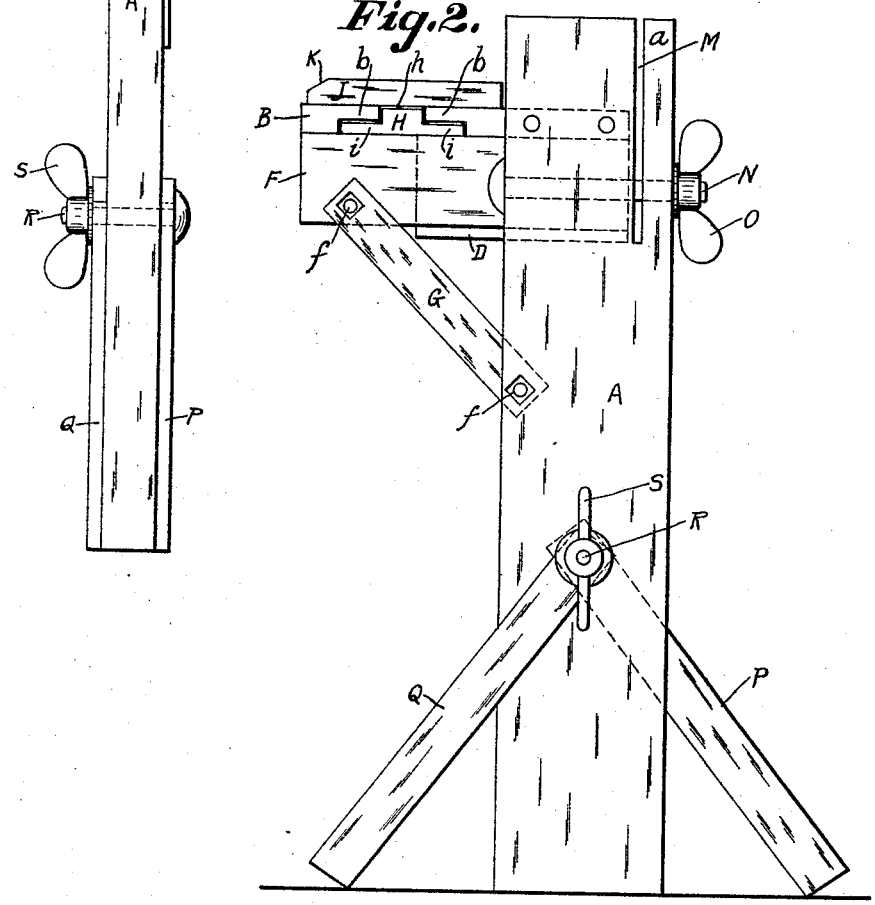

UNITED STATES PATENT OFFICE.

CHARLES OESTREICH, OF MARION, WISCONSIN.

SAW FILING AND SETTING FRAME.

1,074,134.  Specification of Letters Patent.  Patented Sept. 30, 1913.

Application filed May 24, 1912. Serial No. 699,360.

*To all whom it may concern:*

Be it known that I, CHARLES OESTREICH, a citizen of the United States, residing at Marion, county of Waupaca, and State of Wisconsin, have invented new and useful Improvements in Saw Filing and Setting Frames, of which the following is a specification.

My invention relates to improvements in saw filing and setting frames, and has for its object the provision of a frame which is specially adapted to be taken into the woods and used upon uneven ground.

In the drawings—Figure 1 is an elevation of my improved device with one of the supporting legs partially broken away. Fig. 2 is an end elevation of the same.

Like parts are identified by the same reference characters in both views.

End standards A are connected near their upper ends by a table B suitably braced at C from the supporting standards. A tool drawer D is supported by slide rails E from the table B. The table B projects at one side of the standards A and the projecting margin is supported from the standards by arms F. Braces G connect the intermediate portions of the standards A with the outer ends of the arms F, these braces being detachably connected at their respective ends with the standards A and arms F by bolts *f*. A slide H is mounted in a slot *h* formed in the table B and the margins *i* of this slide are of less thickness and are formed to fit underneath over-hanging ledges *b* on the table top. The slide H constitutes an extension which may be moved longitudinally of the table top in either direction to support a saw. During the setting operation, it is necessary to move the saw longitudinally along the table and by extending this slide in one direction or the other, one end of the saw may be supported on the slide when the other end is near the center of the table, a removable metal block J is located upon the table B and provided with a beveled margin K to facilitate setting the saw teeth by bending them downwardly in conformity with the angular surface K.

To facilitate filing the saw, the standards are provided with a kerf M extending downwardly from the top of each standard and near the front margin thereof, subdividing the upper end of the standard into clamping jaws. The narrow jaw *a* of the standard, which occupies the position in front of the kerf M, is adapted to be sprung inwardly by means of a clamping bolt N, one of which passes through each standard, and is provided with a wing nut O.

To hold the standards A in an upright position, each of the standards is provided with a pair of braces P and Q, projecting divergently from the point of pivotal connection with the standard and independently adjustable, whereby said braces may be accommodated to the surface of uneven ground. One of the braces P preferably extends along the inner face of a standard A, while the other brace Q extends along the outer face thereof. Both braces may be secured to the standard by a single clamping bolt R and wing nut S. When the wing nut S is loosened, either brace may be swung to any desired position of adjustment.

From the foregoing description, it will be observed that I have provided a saw filing clamp, which comprises merely a pair of upright standards with adjustable braces thereon, and that I have also made provision for conveniently setting the saw by extending the connecting piece B, which unites the upper end portions of the standards to form a table adapted to support the saw while the teeth are being set. If desired, the metal setting block J may be removed when not in use, and placed in the drawer D, which drawer also serves to contain a file, hammer and any other tools which it may be desired to use.

I claim—

1. A saw filing and setting frame comprising a pair of standards longitudinally slitted at their upper ends to form clamping jaws, a member connecting the upper ends of said standards and forming a saw setting table, a slide adjustably mounted for longitudinal movement in said table, a set of adjustable braces for the standards, and a clamping bolt extending through the jaws near the upper end of each standard.

2. In a device of the described class, the combination with a pair of standards, of a table connecting the upper ends thereof and projecting outwardly from the space between the standards, a slide mounted for longitudinal movement in said table and angularly extending braces for the standards, each connected with a standard by a single pivot bolt, whereby the braces may be swung to any desired position and utilized to hold the standards in an upright position upon uneven ground, substantially as described.

In testimony whereof I affix my signature in the presence of two witnesses.

CHARLES OESTREICH.

Witnesses:
J. H. DRIESSEN,
F. W. HOFFMANN.

Copies of this patent may be obtained for five cents each, by addressing the "Commissioner of Patents, Washington, D. C."